(12) United States Patent
Rosario et al.

(10) Patent No.: US 8,636,231 B2
(45) Date of Patent: Jan. 28, 2014

(54) SYSTEM AND METHOD FOR GENERATING AND DISPERSING A LIQUID-DROPLET HAZE

(76) Inventors: Paul Rosario, Bayville, NJ (US);
Thomas Kaps, Jackson, NJ (US)

( * ) Notice: Subject to any disclaimer, the term of this patent is extended or adjusted under 35 U.S.C. 154(b) by 996 days.

(21) Appl. No.: 12/660,925

(22) Filed: Mar. 8, 2010

(65) Prior Publication Data

US 2011/0215166 A1 Sep. 8, 2011

(51) Int. Cl.
*F23D 11/16* (2006.01)

(52) U.S. Cl.
USPC .............................................. 239/419; 239/8

(58) Field of Classification Search
USPC .................. 239/398, 409, 419, 419.3, 427, 8
See application file for complete search history.

(56) References Cited

U.S. PATENT DOCUMENTS

| | | |
|---|---|---|
| 3,239,960 A | 3/1966 | Stevens |
| 3,648,401 A | 3/1972 | Stains |
| 3,793,762 A | 2/1974 | Stains |
| 4,990,290 A | 2/1991 | Gill et al. |
| 5,056,511 A | 10/1991 | Ronge |
| 5,672,352 A | 9/1997 | Clark et al. |
| 5,700,474 A | 12/1997 | Preiser et al. |
| 6,857,214 B1 | 2/2005 | Pelissier |
| 7,334,745 B2 | 2/2008 | Crawford |
| 2006/0251691 A1 | 11/2006 | Crawford |
| 2007/0057083 A1* | 3/2007 | Bolz ............................... 239/34 |
| 2007/0152078 A1 | 7/2007 | Crawford |
| 2009/0008473 A1 | 1/2009 | Yun |

* cited by examiner

*Primary Examiner* — Davis Hwu
(74) *Attorney, Agent, or Firm* — Rene Martin Oliveras

(57) ABSTRACT

This system comprises: A tank for containing the liquid; the tank comprises a liquid conduit for transporting the liquid; Air compressing means connected to an air conduit for transporting the compressed air; Means for mixing the compressed air at the air conduit outlet and the liquid at the liquid conduit outlet for generating the high velocity first haze state-air mixture; A nozzle structure connected to the mixing means for causing the high velocity first haze state-air mixture to strike the upper surface of the liquid for generating the second haze state-air mixture; A haze conduit being connected to the top portion of the tank for transporting the air-third haze state mixture; and Air blowing means being concentric to the haze conduit outlet for dispersing the fourth haze state-air mixture.

40 Claims, 7 Drawing Sheets

SYSTEM AND METHOD FOR GENERATING AND DISPERSING A LIQUID-DROPLET HAZE

BACKGROUND OF THE INVENTION

1. Field of the Invention

This invention relates to a system and method for generating and dispersing a liquid-droplet haze and in particular to such a system and method for effecting pest control and bird control.

2. Description of the Prior Art

The prior art reveals the following patent references:
1. Stevens U.S. Pat. No. 3,239,960, issued Mar. 15, 1966 and entitled "Apparatus For Dispersing Liquids In A Spray Or Fog", which discloses:

"This invention relates to apparatus for creating a spray or a fog of liquid which is to be dispersed in particle form over a substantially wide area, as for example, in dispersing of liquid insecticides."

"Apparatus of this type. is often required to produce a spray (or a fog) intended to cover a substantially great area. To accomplish this purpose properly, it is necessary to break the liquid into particles of substantially uniform and small size, and to distribute such particles evenly over the area. When a large area is to be covered, the amount of liquid to be handled in this matter is substantial, and it is desirable to provide apparatus which can be operated without requiring substantial maintenance or skill in its use, while being capable of handling the high rates of liquid consumption which are necessary for this purpose."

"For example, the present invention provides a device which can create either a spray (i.e., small particles in air) or a fog (a suspension of fine condensate droplets in a gas) while dispersing liquid insecticide solutions at rates of as much as 120 gallons per hour. On the other hand this rate can be substantially decreased, if the requirements of a job are such that a much lower rate is necessary, without varying the particle size and even particle distribution obtained by the apparatus. In creating fogs, particularly, the velocity of gases through the fogging apparatus may be in the neighborhood of 250 feet per second, at volumes up to 1,000 c.f.m., and at temperatures sufficient to vaporize the liquid completely, for example temperatures in excess of 1,000° F. and in the neighborhood of 1,850° F. While operating at such temperatures and rates, the apparatus must still avoid formation of carbon in the fogging nozzle in order to minimize maintenance problems."

"Furthermore, since many of the carrier liquids for insecticides are flammable, it is necessary to provide a supply of hot gas, for example at the rates and temperatures mentioned above, while avoiding the introduction of flame into the fogging nozzle where the insecticide solution might ignite."

2. Stains U.S. Pat. No. 3,648,401, issued Mar. 14, 1972 and entitled "Low Volume Insecticide Aerosol Generator", which discloses:

"A method of producing an insecticide spray for killing insects with droplets in the size range of from about 5 microns to about 15 microns. The spray consists of an insecticide, such as Naled-14, diluted with a nonvolatile liquid, such as cottonseed oil, in a ratio of 1 to 4 by volume. The aerosol generating equipment includes an engine driven blower supplying air at about 450 cubic feet per minute at a pressure of about 4 psi. This air is supplied to a group of four air-liquid double vertical nozzles that atomizes the insecticide into the 5-micron to 15-micron size range."

"An insecticide aerosol generator comprising: a source of air; a source of insecticide; an elongated manifold; at least one nozzle mounted within and on the wall of said manifold and having the outlet thereof penetrate said wall and communicate with the atmosphere; said nozzle having an insecticide inlet operatively connected to said source of insecticide; said nozzle including a first air inlet section having vanes oriented in a first direction for generating an air vortex having a clockwise direction of rotation and a second air inlet section having vanes oriented in a second direction for generating an air vortex having a counterclockwise direction of rotation; a conduit for supplying air from said source of air to the interior of said manifold; and said first and second air inlet sections being in communication with the air in the interior of said manifold; said at least one nozzle comprises four nozzles spaced at regular intervals along the length of said manifold; said source of air comprises a means that supplies air to said manifold at a rate of about 450 cubic feet per minute and at a pressure of about 4 psi.; said source of insecticide comprises a means for supplying insecticide to said nozzles at a rate in the range from about 0 to about 100 ounces per minute."

"An aerosol generator comprising: a source of liquid; a source of air; spray forming means operatively connected to said source of liquid and said source of air for mixing the liquid from said source of liquid with the air from said source of air; said spray forming means forming at least about 95 percent of the spray from said spray forming means into droplets in the size range of from about 5 microns to about 15 microns; said source of air comprises a high pressure means for supplying air to said spray forming means at a rate of about 450 cubic feet per minute and at a pressure of about 4 psi.; and said source of liquid comprises a high flow rate means for supplying liquid to said spray forming means at a rate in the range of from about 0 to about 100 ounces per minute."

3. Stains U.S. Pat. No. 3,793,762, issued Feb. 26, 1974 and entitled "Low Volume Insecticide Aerosol Generator", which discloses:

"A method of producing an insecticide spray for killing insects with droplets in the size range of from about 5 microns to about 15 microns. The spray consists of an insecticide, such as Naled-14, diluted with a non-volatile liquid, such as cottonseed oil, in a ratio of 1 to 4 by volume. The aerosol generating equipment includes an engine driven blower supplying air at about 450 cubic feet per minute at a pressure of about 4 psi. This air is supplied to a group of four air-liquid double vertical nozzles that atomizes the insecticide into the 5 micron to 15 micron size range."

"A method of producing a chemical spray wherein at least about 95 percent of the spray comprises droplets in the size range of from about 5 microns to about 15 microns in diameter consisting of: passing a high volume of air at an elevated pressure of approximately 4 psi at approximately ambient temperature into a mixing chamber; simultaneously directly introducing a liquid chemical solution into said mixing chamber; and creating a turbulence in the air flow through the chamber and thereby causing a breakup of the liquid solution prior to discharge from the mixing chamber; said turbulence is created by generating an air vortex of the air passing through the mixing chamber; said turbulence is intensified by creating a second air vortex having a direction of flow opposite to said first mentioned air vortex; said spray is intended for the purpose of killing insects such as mosquitoes and flies; said liquid chemical solution comprises 1 part by volume of active insecticide and 4 parts by volume of a non-volatile liquid; said insecticide comprises NALED-14; said non-volatile liquid comprises cottonseed oil."

4. Gill and Becker U.S. Pat. No. 4,990,290, issued Feb. 5, 1991 and entitled "Diffusion Fogger", which discloses:

"A diffusion fogger is packed on a road case. Fans draw air through a baffle chamber and through fan openings into a fan chamber, an air compressor above the fan chamber provides compressed air to a fog head assembly. The fog head assembly releases an oil mist fog into a fog duct. Air from the fan chamber is blown through the duct and out through a front opening, entraining and delivering the fog. Air from the fan chamber is circulated over a path that serves to cool the compressor, compressed air, and exhausts from the outlet ducts. The fog head is a removable vertical assembly of an oil sump chamber and a nozzle array chamber. The nozzles, with inlets to an air manifold draw up filtered oil from an oil manifold and spray a fine mist of oil and decompressed air into the nozzle chamber. The mist continues through the next above baffle box filled with marbles, removing large oil droplets. Oil collected by the marbles drains through the nozzle chamber into the sump, and the mist continues upward and horizontally through the top filter chamber, which has a foam filter. The mist is exhausted into the mist duct, where it is entrained in the air delivered by the fans which carries the fog to the desired location. The fog head and mist duct are located in a vertically hinged door on the road case."

"A diffusing fogger, comprising a soundproof case, an air compressor having an inlet and outlet mounted within the case, a heat exchanger connected to the outlet of the air compressor for cooling compressed air, a water trap connected to an outlet of the heat exchanger for removing water from the cooled compressed air, a venturi nozzle connected to the water trap for releasing dry compressed air, an oil supply connected to the nozzle for drawing oil from the oil supply into the nozzle and atomizing the oil with the dry compressed air and releasing atomized oil from the nozzle, a fan mounted in the case for drawing air into the case and drawing air over the air compressor for cooling the air compressor, and air-directing ducts for directing air from the fan over the compressor and the heat exchanger and directing hot air from the heat exchanger out of the case, and further air-directing ducts for directing air from the fan out of the case around the atomized oil and air from the nozzle."

"Fogger apparatus comprising a multiple layer, thin, rectangular nozzle head and filter box, comprising a first lower oil sump chamber, an oil intake manifold at the bottom of the chamber, the oil intake manifold having vertically-oriented oil line connectors and oil filters horizontally-extending into the oil manifold, a site glass connected to a side of the oil sump chamber, an opening in the top of the oil sump chamber, oil tubes connected to the oil line connectors and extending upward through the opening in the top of the oil sump chamber, a nozzle chamber, an opening in a bottom of the nozzle chamber aligned with the opening in the top of the oil sump chamber, an air manifold positioned in the nozzle chamber, a plurality of nozzles having inlets connected to the air manifold and having spray nozzle outlets, and having oil inlets on the nozzles between the air inlets and the spray nozzles, the oil lines being connected to the oil inlets for drawing oil through the filters and oil manifold and oil lines into the nozzles, with air flowing through the nozzles from the air manifold, the nozzle chamber having a small opening aligned with the air manifold and a compressed air connector connected to the air manifold through the small opening, a nozzle access hole in the nozzle chamber near the small hole for accessing the nozzles, a mist flow hole remote from the nozzle access hole for flowing mist outward, a marble maze chamber positioned adjacent the nozzle chamber, the marble maze chamber having a plurality of openings adjacent the mist opening in the nozzle chamber for flowing mist through the plurality of openings, marbles disposed in the marble chamber, the marble chamber having a mist-releasing opening at an end of the chamber opposite the plural mist-inflow openings in the marble chamber, a filter chamber positioned adjacent the marble chamber, the filter chamber having plural marble-restricting openings in a wall and a mist-releasing opening in a wall at a position thereon remote from the marble-restricting openings wall, and a mist exhaust connected to the mist-releasing opening in the top wall of the filter chamber."

"Fog head apparatus comprising a compressed air connector, an air manifold connected to the compressed air connector for receiving compressed air from the connector, plural venturi spray nozzles having inlets connected to the air manifold, having suction ports and having spray nozzle head outlets, oil supply lines connected to the suction ports, a nozzle chamber surrounding the nozzles and a maze chamber connected to the nozzle chamber for passing oil mist sprayed from the spray nozzle heads through the maze, the maze chamber having an outlet, and a filter chamber having an inlet connected to the outlet of the maze chamber, the filter chamber having a foam filter and a mist outlet port connected to the filter chamber remote from the filter chamber inlet."

"A mist head assembly comprising a plurality of chambers, a first chamber being an oil sump chamber having oil intake means, a second chamber being a nozzle chamber adjacent the first chamber and having a plurality of spray nozzles with receiving means for air and receiving means for oil, and having a mist flow hole for allowing mist to flow from the nozzle chamber, a maze chamber positioned adjacent to the nozzle chamber having a plurality of openings for receiving mist, and having means for collection of large mist particles and passage of finer mist particles, and having an opening for releasing the mist from the maze chamber, a filter chamber positioned adjacent to the maze chamber having a plurality of openings for receiving mist from the maze chamber and having a mist releasing opening, the entire mist head assembly being assembled together as one unit."

"A mist head assembly comprising a vertical assembly of chambers, a first lower chamber being an oil sump chamber, an oil intake manifold at the bottom of the oil sump chamber, the oil intake manifold having vertically orientated oil line connectors and oil filters horizontally extending into the oil manifold, a sight glass connected to a side of the oil sump chamber, an opening in the top of the oil sump chamber, oil tubes connected to the oil line connectors on the manifold and extending upward through the opening in the top of the oil sump chamber, a nozzle chamber atop and adjacent to the oil sump chamber, an opening in a bottom of the nozzle chamber aligned with the opening in the top of the oil sump chamber, an air manifold positioned in the nozzle chamber, a plurality of nozzles having inlets connected to the air manifold and having spray nozzle outlets, and having oil inlets on the nozzles between the air inlets and the spray nozzles, the oil lines being connected to the oil inlets for drawing oil through the filters and oil manifold and oil lines into the nozzles, with air flowing through the nozzles from the oil manifold, the nozzle chamber having a small opening aligned with the air manifold and a compressed air quick coupling connector connected to the air manifold through the small opening, a nozzle access hole in the nozzle chamber near the small hole for accessing the nozzles, a mist flow hole remote from the nozzle access hole for flowing mist outward, a marble maze chamber positioned atop and adjacent the nozzle chamber, the marble maze chamber having a plurality of openings adjacent the mist opening in the nozzle chamber for flowing mist through the plurality of openings, marbles disposed in the marble chamber, the marbles being balls of a hard material that does not absorb oil, the marble chamber having a mist releasing opening at an end of the chamber opposite the plurality of mist inflow openings in the marble chamber, a filter chamber positioned atop and adjacent to the marble chamber, the filter chamber having plural marble restricting openings in a wall and a mist releasing opening in a wall at a position thereon remote from the marble restricting opening wall, and a mist exhaust connected to the mist releasing opening in the top wall of the filter chamber, bolts extending through the filter chamber, through the marble chamber, through the nozzle chamber and through parts of the oil sump chamber and holding the chambers assembled together, a handle connected to the bolts and positioned on the filtered chamber for lifting the carrying the entire mist head assembly as one unit to be easily removed from or installed within a fogger assembly."

5. Ronge U.S. Pat. No. 5,056,511, issued Oct. 15, 1991 and entitled "Method And Apparatus For Compressing, Atomizing, And Spraying Liquid Substances", which discloses:

"The method and apparatus for atomizing and spraying liquid substances serves in particular to produce clouds for inhalation purposes. The liquid substance to be atomized is compressed to such an extent that it decreases in volume and that it is then explosively released into the normal atmosphere. Due to its high internal pressure, the liquid substance bursts into extremely small particles."

"A method for dispensing atomized liquid substances for inhalation comprising: compressing the liquid substance to be atomized at a pressure of $300 \times 10^5$ Pa to $800 \times 10^5$ Pa so that the liquid substance decreases in volume; explosively releasing the compressed liquid substance to the normal atmosphere at a pressure of $1 \times 10^5$ Pa, for causing the liquid substance to burst into extremely small particles; and repeating such steps preferably several times."

6. Clark et als U.S. Pat. No. 5,672,352, issued Sep. 30, 1997 and entitled "Methods Of Identifying The Avian Repellent Effects Of A Compound And Methods Of Repelling Birds From Materials Susceptible To Consumption By Birds", which discloses:

"There is provided by the invention a structure-activity model for identifying avian repellent compounds. It has now been found that certain topological and electronic features of a molecule, especially the presence of a core ring structure, the basicity of the molecule in general, and the electro-negativity of the core ring structure, are predictive of its avian repellency. Such features may be used to identify avian repellent compounds and such compounds may be utilized in methods for repelling birds from consuming or utilizing a material. There is further provided by this invention, novel avian repellents for use in methods of repelling birds from consuming or utilizing materials otherwise susceptible to consumption or utilization. Additionally, methods for repelling birds from consuming or utilizing non-potable aquatic habitats are provided herein."

7. Preiser and Vogt U.S. Pat. No. 5,700,474, issued Dec. 23, 1997 and entitled "Bird Aversion Compositions", which discloses:

"A liquid bird aversion solution having methyl anthranilate in an amount of from 15 to 50% by weight of a total weight of the solution; d-limonene in an amount of from 10 to 50% by weight of a total weight of the solution; and isopropyl myristate in an amount of from 10 to 50% by weight of a total weight of the solution. The liquid solution is lighter than water and forms a thin liquid film on a surface of a source when applied to the source."

8. Pelissier U.S. Pat. No. 6,857,214, issued Feb. 22, 2005 and entitled "Scent Dispersal Apparatus", which discloses:

"A scent dispersal apparatus includes a housing having an aperture for permitting gaseous communication between an interior of the housing and an ambient atmosphere. The scent dispersal apparatus also includes a gaseous flow device provided for generating a gaseous stream, and a scent reservoir. The gaseous flow device selectively entrains molecules of a scent disposed within the scent reservoir to form a scent laden gaseous stream, the scent laden gaseous stream being exhausted through the aperture to the ambient atmosphere."

"A scent dispersal apparatus, comprising: a housing having an aperture for permitting gaseous communication between an interior of said housing and an ambient atmosphere; a gaseous flow device for generating a gaseous stream; a scent reservoir, wherein said gaseous flow device selectively entrains molecules of a scent disposed within said scent reservoir to form a scent laden gaseous stream, said scent laden gaseous stream being exhausted through said aperture to said ambient atmosphere; and wherein said gaseous flow device directs said gaseous stream to said scent reservoir via a first conduit extending from said gaseous flow device to said scent reservoir, said first conduit including a valve assembly for selectively isolating said scent reservoir from fluid communication with said gaseous flow device."

"A scent dispersal apparatus, comprising: a housing having a first compartment and a second compartment, said first compartment accommodating a gaseous flow device for generating a gaseous stream and said second compartment accommodating a scent reservoir for holding liquid animal scent; a first conduit extending from said gaseous flow device and into said scent reservoir, said first conduit having a distal end submerged within said liquid animal scent and disposed adjacent a bottom of said scent reservoir; a second conduit extending from said scent reservoir and through an aperture in an exterior wall of said housing, said second conduit having a distal end disposed within said scent reservoir yet above the level of said liquid animal scent; and wherein said gaseous flow device directs said gaseous stream through said second conduit and into said liquid animal scent, thereby entraining molecules of said liquid animal scent and forming a scent laden gaseous stream which is exhausted to an ambient atmosphere via said second conduit."

9. Crawford patent application publication 2006-0251691, published Nov. 9, 2006 and entitled "Apparatus For Dispersing A Bird Haze Product From A Can", which discloses:

"An aerosol tiny mist hazer apparatus. The apparatus has an aerosol can that contains about 10% by weight Methyl Anthranilate oil and about 90% by weight of an iso-butane and propane propellant mixture. The apparatus has an aerosol valve with a vapor tap at the top and having a fine aerosol nozzle for producing a fine, evenly dispersed and stable haze having particle sizes less than 20 microns (in the form of a breathable haze) for use in maintaining birds flying away."

"An aerosol haze apparatus for producing a mist haze comprising: an aerosol can containing a pressurized solution of about 10% by weight Methyl Anthranilate oil and about 90% by weight of an iso-butane and propane propellant mixture; an aerosol valve coupled to the can; and a aerosol nozzle coupled to the valve, wherein the nozzle when activated produces a mist haze that includes the contents of the can, the mist haze has an average particle size less than about 20 microns."

"An aerosol mist haze apparatus for producing a fine light tiny mist haze comprising: a handheld portable aerosol can containing about 10% by weight Methyl Anthranilate oil mix and about 90% by weight of a propellant; an aerosol valve coupled to the can; and a aerosol nozzle coupled to the valve for producing a mist haze when activated, the mist haze having an average particle size less than about 20 microns while being released."

10. Crawford patent application publication 2006-0152078, published Jul. 5, 2007 and entitled "Method And System For Dispensing A Dry Haze Nasal Treatment From A Liquid", which discloses:

"Methods and apparatus for dispensing the chemical solutions, such as a low viscosity liquid chemical solution for inhaling size, are disclosed. A small particle haze, including a liquid chemical, such as low viscosity liquids that are inhaled when in haze form, is created in an enclosed container. The small particle haze is created by one or more venturi nozzles. The small particle haze is filtered to remove particles in excess of a predetermined size. The remaining particles are combined with a stream of air that separates the particles into a dry haze. The stream of air also directs the combination into a dispensing tube that includes a plurality of outlets for dispensing the dry haze. Relatively small diameter sized dispensing tubes are formed of a relatively rigid material such as polyvinyl chloride (PVC). Larger sized dispensing tubes are inflatable. The air added to inflate inflatable tubes further separates the dry haze particles. Filtering prevents dirt and debris from polluting the dry haze that is created through the mixture of clean dry air with the small particles."

"A method of dispensing a dry haze, comprising: generating a dry haze containing small particles containing a liquid chemical solution; filtering the dry haze to remove particles above a predetermined size; and blowing air into the filtered dry haze to separate the particles containing a liquid chemical solution and direct the particles containing a liquid chemical solution into a closed distribution system or directly into the air."

"Apparatus for dispensing a liquid chemical solution, comprising: a haze generator for generating a haze containing small particles including a low viscosity liquid for inhaling, a filter for filtering the haze containing small particles including a liquid chemical to remove particles above a predetermined size; a blower system for creating a high speed air stream, combining the high speed air stream with said filtered haze to increase the separation between said small particles containing a liquid chemical to create a dry haze and direct said dry haze into a distribution system; and a distribution system for receiving and distributing said filtered dry haze over large areas."

11. Crawford U.S. Pat. No. 7,334,745, issued Feb. 26, 2008 and entitled "Hazing A Bird Repellent Solution", which discloses:

"A method and a machine for dispersing a liquid bird repellent solution. The method includes providing a liquid bird repellent solution at a first orifice. The first orifice is defined in a liquid conduit. A flow of air is released through a second orifice to an ambient atmosphere. The second orifice is defined in an air conduit. The air conduit encloses the first orifice and contains air at a pressure significantly elevated with respect to that of the ambient atmosphere. The second orifice is spaced sufficiently apart from the first orifice to allow the flow of air to form a venturi to entrain droplets of the liquid bird repellent solution into the flow of air from the first orifice."

"A method for dispersing a liquid bird repellent solution, the method comprising: delivering a pressurized flow of air through a jet; sending a liquid bird repellent solution to an orifice; dispersing the liquid bird repellent solution in the pressurized flow of air; and filtering the droplets entrained in the flow of air to cause the removal of droplets in excess of 20 microns in diameter from the dispersed liquid bird repellent solution, wherein the jet is spaced sufficiently apart from the orifice to allow the flow of air to entrain droplets of the liquid bird repellent solution into the flow of air from the jet."

"A machine for dispersing a liquid bird repellent solution, the machine comprising: a housing including a reservoir of liquid bird repellent solution, the housing defining an airspace and also including an exhaust port; a first conduit having an orifice, the first conduit being configured to conduct the liquid bird repellent solution from the reservoir to the orifice, the orifice being located within the airspace; and a second conduit having a jet, the second conduit configured to conduct pressurized air to the jet, the jet located within the housing and being spaced sufficiently apart from the orifice to allow the pressurized air to entrain the liquid bird repellent solution out of the orifice and create a mist of the entrained liquid bird repellent solution."

12. Yun patent application publication 2009-0008473, published Jan. 8, 2009 and entitled "Portable Haze Sprayer Having Multiple-Function", which discloses:

"A portable haze sprayer having a multi-function that can spray powder chemicals or a fertilizer, spray chemicals in a high pressure, and widely spray chemicals is provided. The portable haze sprayer includes: a chemical container including a pipe connector for supplying a wind pressure and a supply pipe to be an exit of stored liquid chemicals; an air blower to be driven with an engine; a frame for supporting the chemical container, the engine, and the air blower; an elbow that is communicated to an output terminal of the air blower to supply a wind pressure to the pipe connector of the chemical container through an air supply pipe; a spray pipe that is communicated to the elbow and that hazes chemicals that are supplied from the chemical container; a powder supply pipe that is provided at a side of the elbow to spray a granular fertilizer or powder chemicals to the injection pipe to be opened or closed with a valve with a handle; a pump that is mounted at the center of the frame; a clutch means that is disposed between the air blower and the pump and that interlocks with a clutch lever to switch power; and a level guide for guiding the clutch lever, and a blade assembly that includes a pair of bosses that is disposed to sustain an interval by a bushing within the injection pipe to be rotatably supported a blade."

"A portable haze sprayer comprising: a chemical container provided with a pipe connector for supplying a wind pressure from outside and a supply pipe to be an exit of stored liquid chemicals; an air blower to be driven by an engine; a frame for supporting the chemical container, the engine, and the air blower; an elbow that is communicated to an output terminal of the air blower and supplying a wind pressure to the pipe connector of the chemical container through an air supply pipe; and a spray pipe that is interposed to the elbow and a reducer and provided with a blade assembly for hazing chemicals therein, and a powder supply pipe that is opened or closed by a valve which is provided at one end of the elbow, the valve having a handle."

"A portable haze sprayer comprising: a chemical container provided with a pipe connector for supplying a wind pressure from outside, a supply pipe to be an exit of stored liquid chemicals, and containing liquid chemicals therein; an air blower to be driven by an engine; a frame for supporting the chemical container, the engine, and the air blower; an elbow that is communicated to an output terminal of the air blower and supplying a wind pressure to the pipe connector of the chemical container through an air supply pipe; a pump disposed opposite to the air blower in a center of the frame, a spray pipe that is interposed to the elbow and a reducer and provided with a blade assembly for hazing chemicals therein, and a clutch mean for switching a power transmission series of between the air blower and the pump."

"A portable haze sprayer comprising: a chemical container comprising a pipe connector for supplying a wind pressure and a supply pipe to be an exit of stored liquid chemicals; an air blower to be driven with an engine; a frame for supporting the chemical container, the engine, and the air blower; an elbow that is communicated to an output terminal of the air blower to supply a wind pressure to the pipe connector of the chemical container through an air supply pipe; a spray pipe that is communicated to the elbow and in which a blade assembly for hazing chemicals that are supplied from the chemical container is provided at the inside thereof; a powder supply pipe that is provided at a side of the elbow to spray a granular fertilizer or powder chemicals to the injection pipe to be opened or closed with a valve with a handle; a pump that is mounted at the center of the frame; a clutch means that is disposed between the air blower and the pump and that interlocks with a clutch lever to switch power; and a level guide for guiding the clutch lever, wherein the blade assembly of the injection pipe comprises a pair of bosses that is disposed to sustain a predetermined interval by a bushing and that rotatably supports a blade."

A review of the above cited patent references reveals that such references do not disclose applicants' claimed invention.

SUMMARY OF THE INVENTION

According to one embodiment of the present invention, a system for generating and dispersing a liquid-droplet haze comprises:

A tank for containing the liquid that is to be converted into a haze state; the liquid being located on the lower portion of the tank; the liquid and the air in the tank defining a liquid-air interface; and the tank further comprising a liquid conduit for transporting the liquid from the liquid conduit inlet to the liquid conduit outlet;

Air compressing means being connected to an air conduit for transporting the compressed air from the air conduit inlet to the air conduit outlet;

Means for mixing the compressed air at the air conduit and the liquid at the liquid conduit outlet for generating the high velocity first haze state-air mixture;

A nozzle structure being connected to the mixing means for causing the high velocity first haze state-air mixture to strike the upper interface of the liquid for generating the second haze state-air mixture;

A haze conduit being connected to the top portion of the tank for transporting the air-third haze state mixture from the haze conduit inlet to the haze conduit outlet; and Air blowing means being concentric to the haze conduit outlet for dispersing the fourth haze state-air mixture.

Objects of the present invention are therefor to:
1. Generate a liquid droplet haze from a liquid.
2. Disburse a liquid droplet haze.

Advantages of the present invention are therefor that:
1. The haze liquid-droplets are about 3 microns in size.
2. The liquid-to-haze generating process is of high efficiency.
3. The haze dispersing process has a long distance range.
4. The dispersed haze tends to remain airborne and tends not to drop to the ground.

BRIEF DESCRIPTION OF THE DRAWINGS

The above and other objects, advantages and features of the present invention will be further appreciated from a reading of the following detailed description in conjunction with the drawing in which:

FIG. 5A shows haze system 10 featuring rotary turret system 40 and global positioning system 70 according to the present invention; while

DETAILED DESCRIPTION OF THE INVENTION

Figure 1:
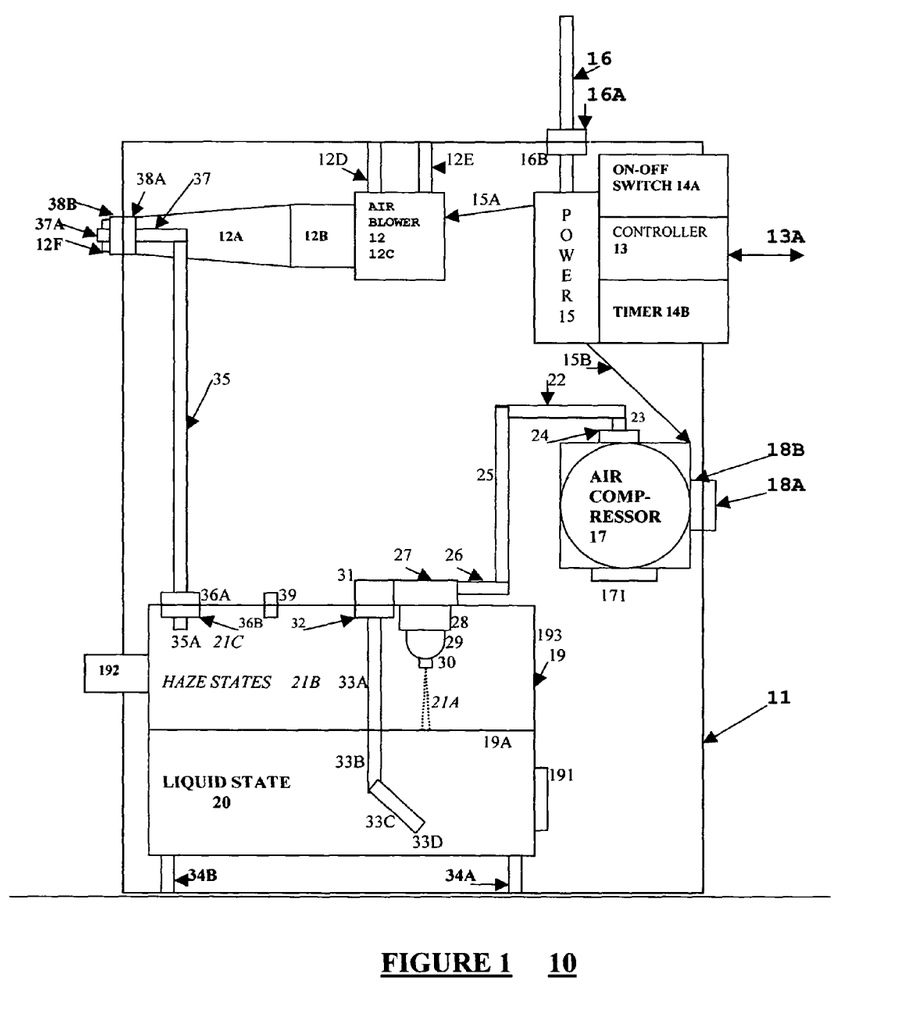
FIG. 1 is a side-view of haze system 10 according to the present invention.

FIG. 1

FIG. 1 is a side-view of haze generating and dispersing system 10 according to the present invention. Haze system 10 generally comprises housing 11 which includes a power and control center; air blower structure 12; air compressor structure 17; and tank structure 19. According to the present invention, the term "haze" means haze, vapor, fog, liquid droplets or the like.

The power and control center comprises input power line 16; power distribution housing 15; securing means 16A and 16B for securing power line 16 and power housing 15; ON-OFF switch 14A; general system controller 13; and timer 14B. The power and control center receives control signals from the outside and transmits signals to the outside via transmission means 13A.

Air blower structure 12 comprises proximal housing member 12C; middle housing member 12B; and distal housing member 12A. Transmission means 15A provides power and control signals from power distribution housing 15 to air blower structure 12. Securing means 12D and 12E secure proximal housing member 12C to housing 11. Securing means 38A and 38B secure distal housing member 12A to housing 11. Distal housing member 12A further comprises air outlet or output orifice member 12F.

Air compressor structure 17 comprises heating member 171; securing means 18A and 18B for securing air compressor structure 17 to housing 11; air conduit or line 23; air conduit or line 22; air conduit or line 25; and air conduit or line 26. Securing member 24 secures air conduit or line 23 to air compressor structure 17. Transmission means 15B provides power and control signals from power distribution housing 15 to air compressor structure 17.

Tank structure 19 comprises: housing 193; heating element 191; air vent 192; supporting and securing means 34A and 34B; haze conduit or line 35; haze conduit or line 37; means 36A and 36B for securing conduit 35 onto tank housing 193; liquid filling cap 39; liquid conduit or line 33C; liquid conduit or liquid line segment 33B below liquid-air interface 19A; liquid conduit or liquid line segment 33A above liquid-air interface 19A; and right-angle elbow or member 31. Securing means 32 secures liquid conduit or liquid line segment 33A to 
tank housing 193. Air vent 192 is attached to housing 193 above liquid-air interface 19A.

The compressed air traveling along air conduits 23, 22, 25 and 26 enters mixing chamber 27. Simultaneously, liquid located below liquid-air interface 19A is sucked upward and into input or entry orifice 33D and into liquid conduits 33C, 33B, 33A and right-angle elbow 31 and into mixing chamber 27. Thereafter the high velocity compressed air entering mixing chamber 27 from air conduit 26 and the liquid entering mixing chamber 27 from right-angle elbow 31 mix and are forced downward into nozzle structure 29 and out of nozzle 30. Securing means 28 secures nozzle structure 29 onto housing 193. Securing means 32 secures liquid conduit segment 33A onto housing 193.

At this point the high-velocity mixture or stream of air and hazed liquid emanates downward from nozzle 30. Such high-velocity mixture or stream is aimed and directed perpendicularly onto liquid-air interface 19A just below nozzle 30. The high-velocity mixture or stream emanating downward from nozzle 30 is called first haze state-air mixture 21A. Upon impact of first haze state-air mixture 21A onto liquid-air interface 19A there is formed and dispersed above and onto liquid-air interface 19A what is called second haze state-air mixture 21B. A first lighter portion of second haze state-air mixture 21B remains floating above liquid-air interface 19A and migrates leftwardly above liquid-air interface 19A. A second heavier portion of second haze state-air mixture 21B falls back downwardly onto liquid-air interface 19A and the haze droplets again become part of liquid state 20 below liquid-air interface 19A. First haze state-air mixture 21A advantageously exits nozzle structure at a pressure from about 20 psi to about 30 psi.

That remaining portion of second haze state-air mixture 21B that migrates leftwardly towards and reaches input or entry orifice 35A of conduit 35 is called third haze state-air mixture 21C. Upon turning ON air blower structure 12 such third haze state-air mixture 21C is sucked upwardly and into input or entry orifice 35A and along conduits 35 and 37 whereupon third haze state-air mixture 21C exits and is propelled and dispersed out of and away from output orifice 37A as fourth haze state 21D as will be hereinafter in relation to FIG. 6.

In haze system 10, air compressing means 17 turns ON for about 10 seconds to about 15 seconds and then shuts down for about 2 minutes to about 3 minutes and then may turn ON again to repeat such cycle.

In haze system 10, air blowing means 12 turns ON for about 30 seconds and then shuts down for about 2 minutes to about 3 minutes and then may turn ON again to repeat such cycle.

In haze system 10: first haze state 21A comprises hazed liquid droplets of about 5 microns to about 10 microns in diameter; second haze state 21B comprises hazed liquid droplets of about 3 microns to about 5 microns in diameter; and third haze state 21C comprises hazed liquid droplets of about 3 microns in diameter.

Figure 2:
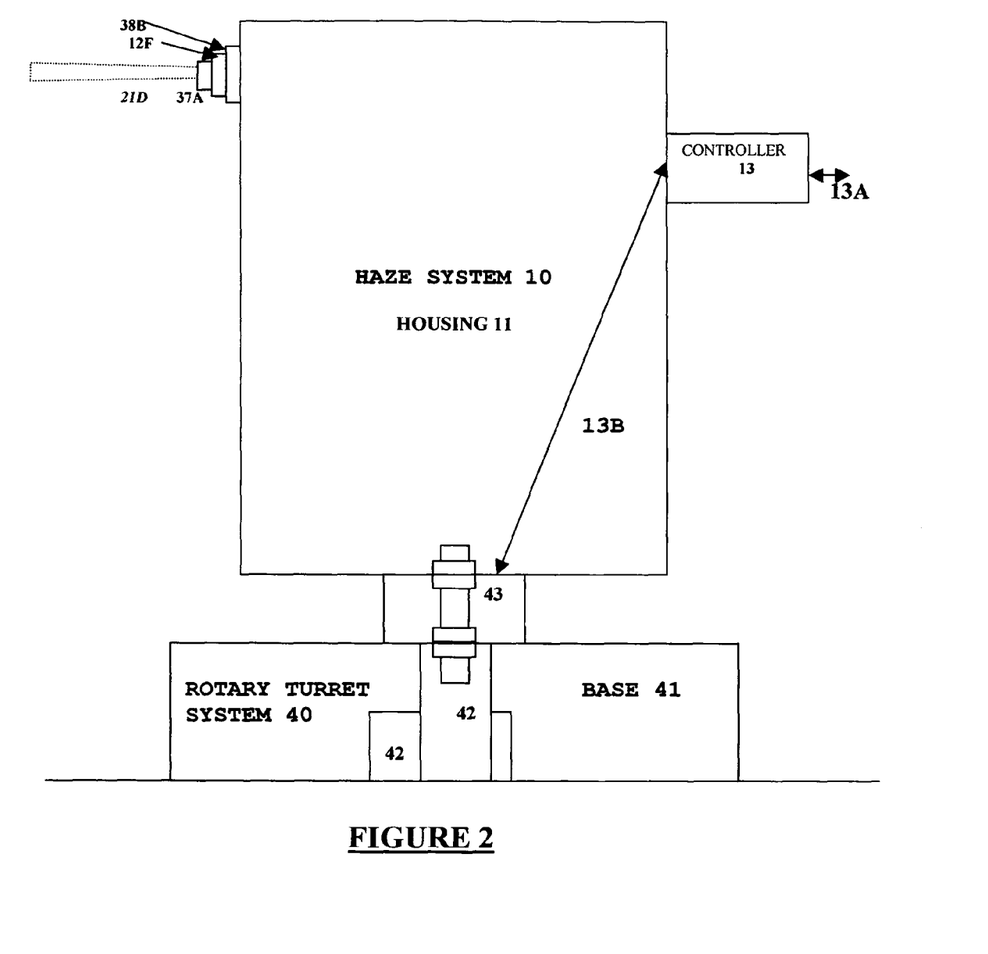
FIG. 2 shows haze system 10 featuring rotary turret system 40 according to the present invention.

FIG. 2

FIG. 2 shows haze system 10 featuring rotary turret system 40 according to the present invention. Haze system 10 comprises housing 11; controller system 13; securing means 38B; air blower outlet member 12F; and haze output orifice 37A which outwardly projects and disperses fourth haze state 21D. Rotary turret system 40 comprises base member 41 which in turn comprises motor or other suitable turning means 42 and rotary motion transfer H means 43. Transfer means 43 is able to cause rotation of housing 11 about a vertical axis in order to controllably aim the direction of fourth haze state 21D. Controller 13 may be pre-programmed or may receive program signals via wired or wireless transmission means 13A. Controller 13 then controls the motion of rotary turret system 40 via transmission means 13B.

Figure 3:
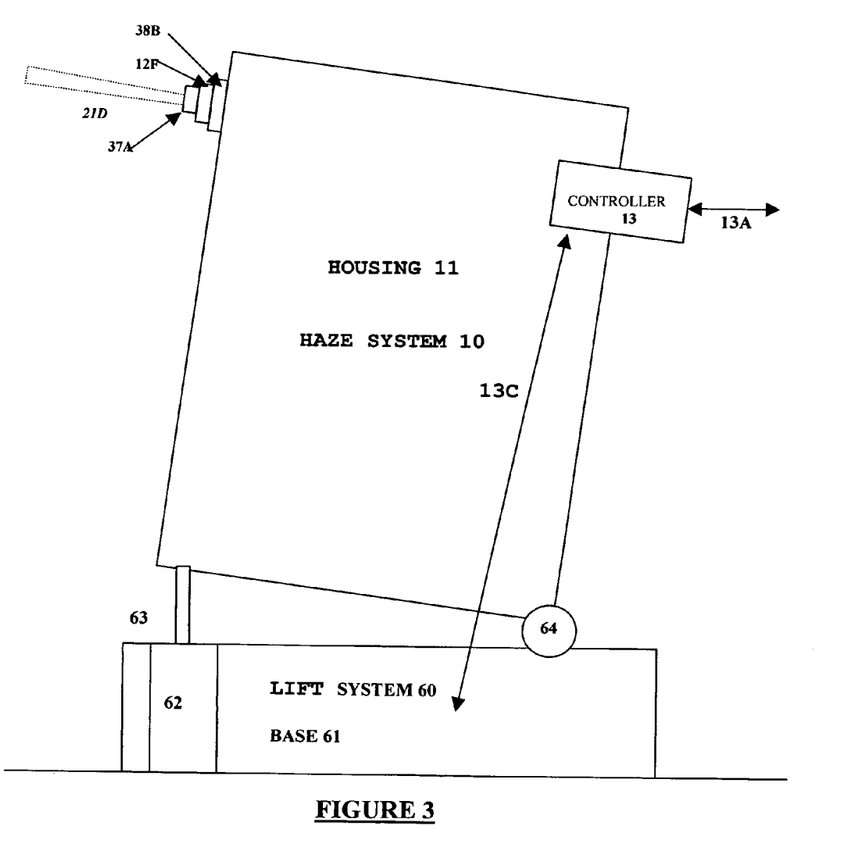
FIG. 3 shows haze system 10 featuring lift system 60 according to the present invention.

FIG. 3

FIG. 3 shows haze system 10 featuring lift system 60 according to the present invention. Haze system 10 comprises housing 11; controller system 13; securing means 38B; air blower outlet member 12F; and haze output orifice 37A which outwardly projects and disperses fourth haze state 21D. Lift system 60 comprises base member 61 further comprising internal motor or other suitable powered means 62; lifting means 63; and horizontal rotary axis member 64. Lifting means 63 is able to cause motion upwardly and downwardly of housing 11 about horizontal rotary axis member 64 in order to controllably aim the upward and downward dispersal direction of fourth haze state 21D.

Controller 13 may be pre-programmed or may receive program signals via wired or wireless transmission means 13A. Controller 13 then controls the motion of lift system 60 via transmission means 13C.

Figure 4:
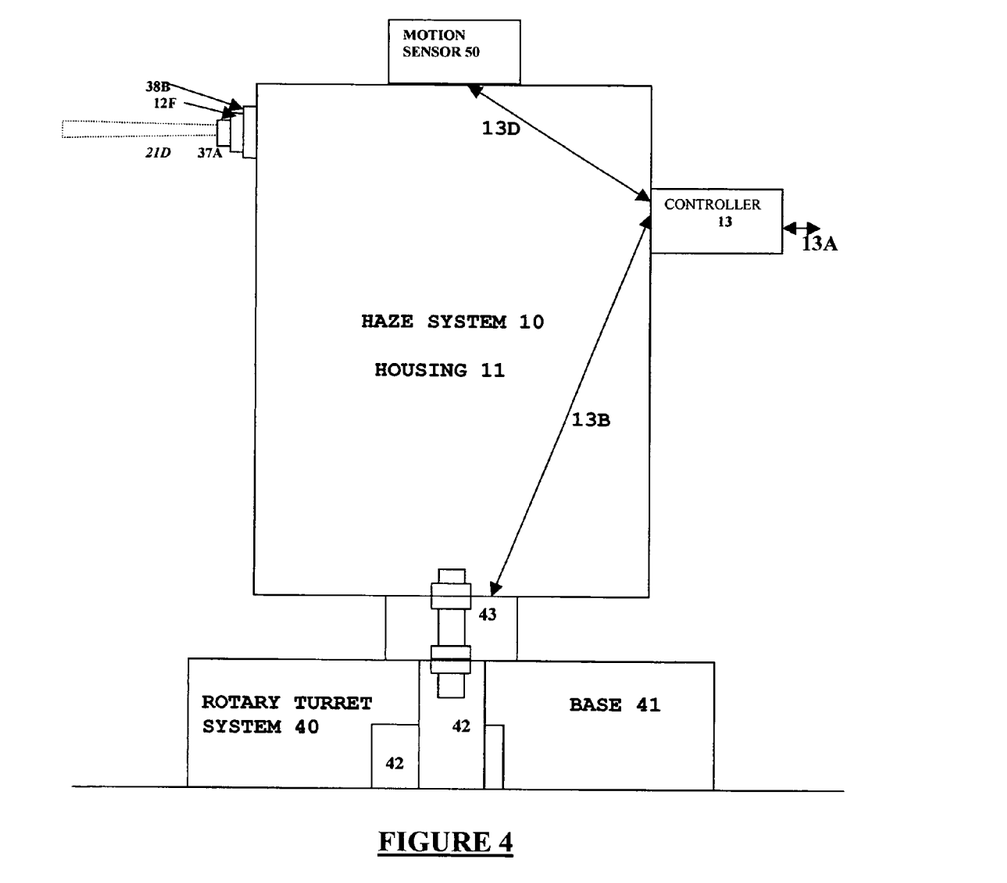
FIG. 4 shows haze system 10 featuring rotary turret system 40 and motion sensor 50 according to the present invention.

FIG. 4

FIG. 4 shows system 10 featuring rotary turret system 40 and motion sensor 50 according to the present invention. Haze system 10 comprises housing 11; controller system 13; housing securing means 38B; air blower outlet member 12F; motion sensor 50; and haze output orifice 37A which outwardly projects and disperses fourth haze state 21D. Rotary turret system 40 comprises base member 41 further comprising motor or other suitable turning means 42; and rotary motion transfer means 43. Transfer means 43 is able to cause rotation of housing 11 about a vertical axis in order to controllably aim the dispersal direction of fourth haze state 21D. Controller 13 may be pre-programmed or may receive program signals via wired or wireless transmission means 13A. Controller 13 then controls the motion of rotary turret system 40 via transmission means 13B. In this case, motion sensor 50 is capable of sensing motion over 360 degrees. Upon sensing such motion then motion sensor 50 sends a detection signal to controller 13 via transmitting means 13D. Thereafter, controller 13 processes the detection signal from motion sensor 50 in order to cause rotary turret system 40 to controllably rotate housing 11 and haze output orifice 12F in the direction of the detected motion. The system of FIG. 4 is advantageously utilized to detect the motion of distal birds and to disperse fourth haze state 21D in the direction of such detected bird motion.

Figure 5A:
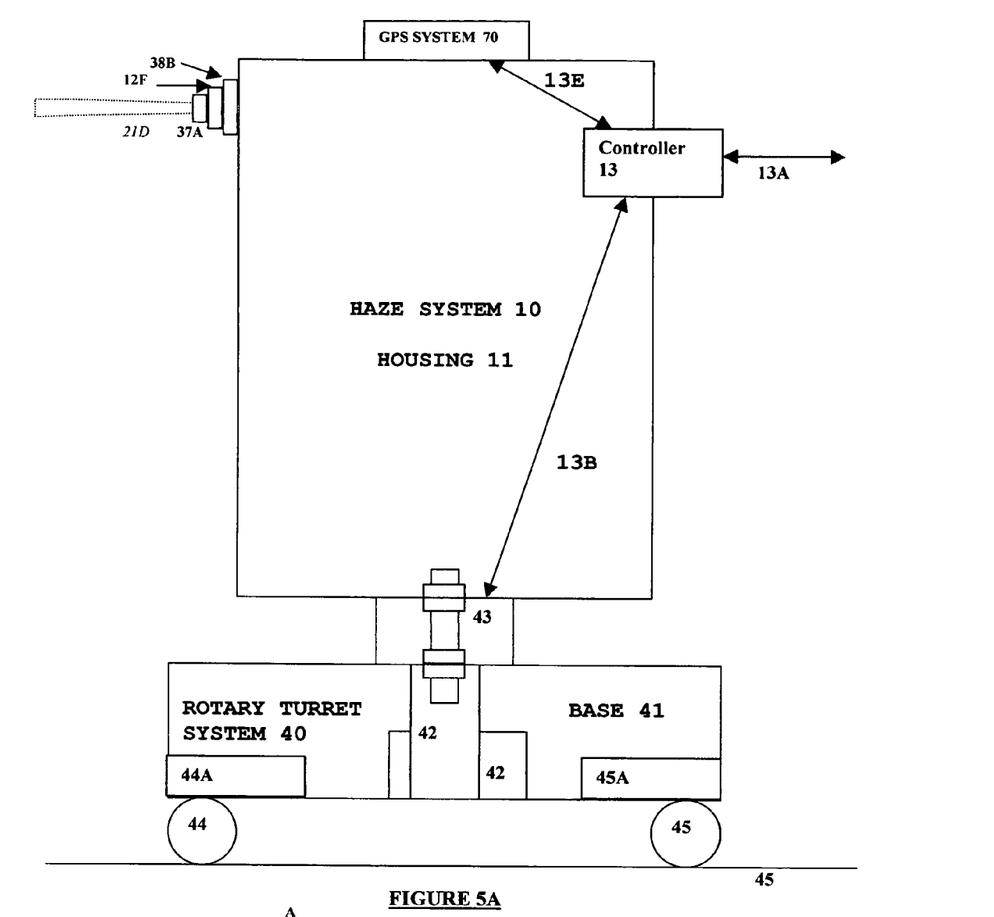
Figure 5B:
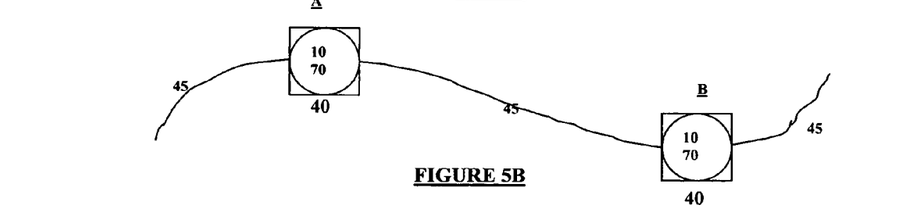
FIG. 5B shows the motion of system 10 along defined path 45.

FIGS. 5A and 5B

FIG. 5A shows haze system 10 featuring rotary turret system 40 and global positioning system 70 according to the present invention; while FIG. 5B shows the motion of haze system 10 along pre-defined path 45. Haze system 10 comprises housing 11; controller system 13; housing securing means 38B; air blower outlet member 12F; global positioning system member 70; and haze output orifice 37A which outwardly projects and disperses fourth haze state 21D. Rotary turret system 40 comprises base member 41 further comprising motor or other suitable turning means 42; and rotary motion transfer means 43. Transfer means 43 is able to cause rotation of housing 11 about a vertical axis in order to controllably aim the dispersal direction of fourth haze state 21D. Base 41 further comprises motor 44A for controllably driving wheel 44 and motor 45A for controllably driving wheel 45. Controller 13 may be pre-programmed or may receive program signals via wired or wireless transmission means 13A. Controller 13 then controls the motion of rotary turret system 40 via transmission means 13B. In this case, GPS system 70 senses the location of haze system 10 over pre-defined course 45. Upon sensing such location then GPS system 70 sends a detection signal to controller 13 via transmitting means 13E. Thereafter, controller 13 processes the location signal from GPS system 70 in order to cause rotary turret system 40 to controllably rotate housing 11 and haze output orifice 12F in the pre-programmed direction at the detected location. In FIG. 5B motorized wheels 44 and 45 cause motion of haze system 10 along pre-defined pathway 45 to location A and then to location B. In each case, GPS system 70 determines the location of haze system 10 and sends a location signal to controller 13. Controller 13 then determines in which pre-determined angular direction that rotary turret system 40 is to rotate and direct housing 11 and haze output orifice 37A for that location. In other words, controller 13 has pre-stored therein the location-direction database to effect such dispersal function.

Figure 6:
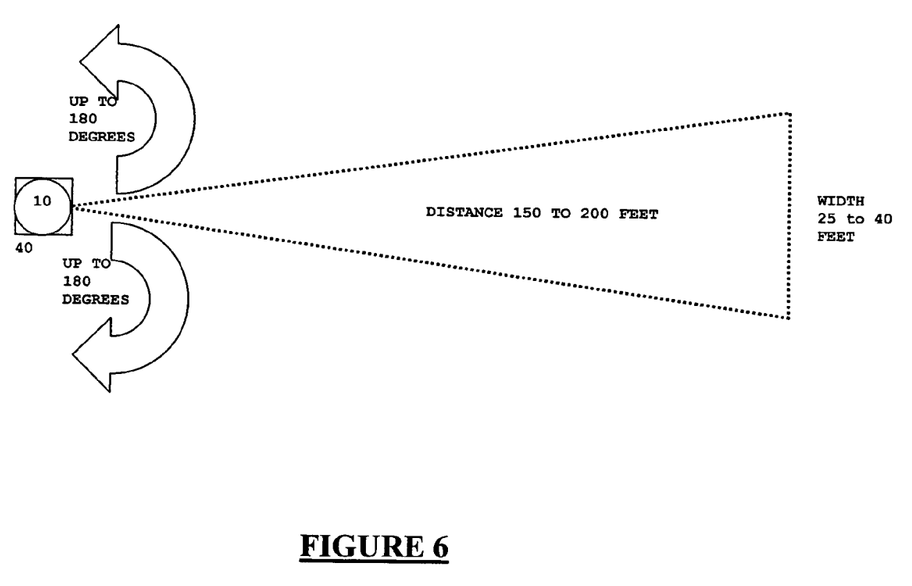
FIG. 6 shows the dispersing parameters of system 10 featuring rotary turret system 40 according to the present invention.

FIG. 6

FIG. 6 shows distribution—dispersal parameters of haze system 10 featuring rotary turret system 40 according to the present invention. Generally haze system 10 is capable of directing and dispersing fourth haze state 21D in a conical pattern a distance of about 150 feet to about 200 feet with a distal lateral width of about 25 feet to about 40 feet. Also rotary turret system 40 is capable of rotating housing 10 up to about 180 degrees counter-clockwise and up to about 180 degrees clockwise.

Figure 7:
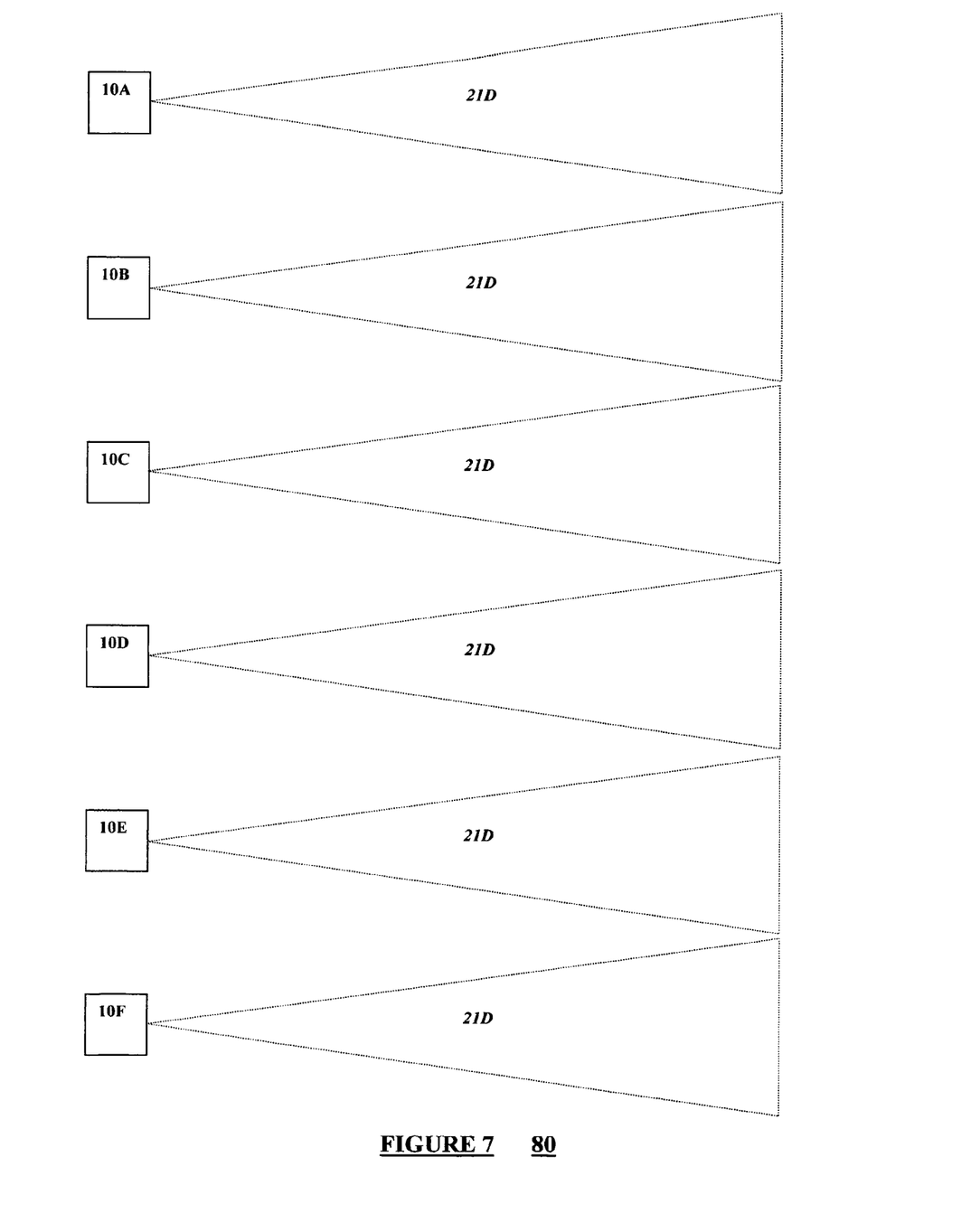
FIG. 7 shows haze system array 80 comprising a plurality of haze systems according to the present invention.

FIG. 7

FIG. 7 shows array 80 comprising a plurality of haze systems 10A through 10F according to the present invention. Each such haze system is capable of directing and dispersing fourth haze state 21D in a conical pattern a distance of about 150 feet to about 200 feet and a distal lateral width of about 25 feet to about 40 feet.

When haze system 10 is utilized as a bird control system then liquid state 20 may be the above cited liquid Methyl Anthranilate.

Apparatus Features

1. In FIG. 1, A system for generating and dispersing a liquid-droplet haze comprises:

A tank for containing the liquid that is to be converted into a haze state; the upper surface of such liquid and the air in said tank defining a liquid-air interface; and said tank further comprising a liquid conduit having an inlet and an outlet for transporting such liquid from said liquid conduit inlet to said liquid conduit outlet;

Air compressing means for providing compressed air and being connected to an air conduit having an inlet and an outlet for transporting such compressed air from said air conduit inlet to said air conduit outlet;

Means for mixing such compressed air at said air conduit outlet and such liquid at said liquid conduit outlet for generating a high velocity first haze state-air mixture;

A nozzle structure being connected to said mixing means for causing such high velocity first haze state-air mixture to strike the upper surface of such liquid below said nozzle structure for generating a second haze state-air mixture below said nozzle structure and for generating a third haze state-air mixture laterally from said nozzle structure;

A haze conduit having an inlet and an outlet and being connected to the upper portion of said tank for transporting such third haze state-air mixture from said haze conduit inlet to said haze conduit outlet; and Air blowing means having an outlet being concentric to said haze conduit outlet for generating and dispersing a fourth haze state-air mixture.

2. In FIG. 1, said first haze state-air mixture comprises hazed liquid droplets from about 5 microns to about 10 microns in diameter.

3. In FIG. 1, said first haze state-air mixture exits said nozzle structure at a pressure from about 20 psi to about 30 psi.

4. In FIG. 1, said second haze state-air mixture comprises hazed liquid droplets from about 3 microns to about 5 microns in diameter.

5. In FIG. 1, said third haze state-air mixture comprises hazed liquid droplets of about 3 microns in diameter.

6. In FIG. 6, said fourth haze state-air mixture is dispersed along a longitudinal distance of about 150 feet to about 200 feet.

7. In FIG. 6, said fourth haze state-air mixture is dispersed along a distal lateral width of about 25 feet to about 40 feet.

8. In FIG. 1, said air compressing means, said tank, and said air blowing means are contained within a common housing.

9. In FIG. 1, said air compressing means is connected to a heating element.

10. In FIG. 1, said tank is connected to a heating element.

11. In FIG. 1, said air compressing means turns ON for about 10 seconds to about 15 seconds and then shuts OFF for about 2 minutes to about 3 minutes and then may turn ON again to repeat said cycle.

12. In FIG. 1, said air blowing means turns ON for about 30 seconds and then shuts OFF for about 2 minutes to about 3 minutes and then may turn ON again to repeat said cycle.

13. In FIG. 1, said air compressing means turns ON for about 10 seconds to about 15 seconds and then shuts OFF for about 2 minutes to about 3 minutes and then may turn ON again to repeat said cycle; and wherein said air blowing means turns ON for about 30 seconds and then shuts OFF for about 2 minutes to about 3 minutes and then may turn ON again to repeat said cycle.

14. In FIG. 2, said housing is mounted onto a rotatable turret base for allowing and causing rotation of said housing about a vertical axis.

15. In FIGS. 2 and 6, said housing is mounted onto a rotatable turret base for allowing and causing rotation of said housing plus 180 degrees and minus 180 degrees about a vertical axis.

16. In FIG. 3, said housing is mounted onto a base member; and wherein said base member comprises lifting means for allowing and causing lifting of said housing about a horizontal axis.

17. In FIG. 4, a motion sensor is mounted onto said housing, said motion sensor detecting bird motion for activating said system to disperse said fourth haze state-air mixture in the direction of said detected bird motion.

18. In FIG. 7, An array for generating and dispersing a plurality of fourth haze state-air mixtures comprises a plurality of systems 10 in a defined physical relationship.

19. In FIGS. 5A and 5B, a global positioning system is mounted onto said housing for detecting the geographical location of said housing; said system being programmed to be activated for dispersing said fourth haze state-air mixture at a pre-programmed housing location in a pre-programmed direction.

While the present invention has been described in terms of specific illustrative embodiments, it will be apparent to those skilled in the art that many other embodiments and modifications are possible within the spirit and scope of the disclosed principle.

What is claimed is:

1. A system for generating and dispersing a liquid-droplet haze comprising:

A tank for containing the liquid that is to be converted into a haze state; the upper surface of such liquid and the air in the tank defining a liquid-air interface; and said tank further comprising a liquid conduit having an inlet and an outlet for transporting such liquid from said liquid conduit inlet to said liquid conduit outlet;

Air compressing means for providing compressed air and being connected to an air conduit having an inlet and an outlet for transporting such compressed air from said air conduit inlet to said air conduit outlet;

Means for mixing such compressed air at said air conduit outlet and such liquid at said liquid conduit outlet for generating a high velocity first haze state-air mixture;

A nozzle structure being connected to said mixing means for causing such high velocity first haze state-air mixture to strike the upper surface of such liquid below said nozzle structure for generating a second haze state-air mixture below said nozzle structure and for generating a third haze state-air mixture laterally from said nozzle structure;

A haze conduit having an inlet and an outlet and being connected to the upper portion of said tank for transporting such third haze state-air mixture from said haze conduit inlet to said haze conduit outlet; and Air blowing means having an outlet being concentric to said haze conduit outlet for generating and dispersing a fourth haze state-air mixture.

2. In the system of claim 1, wherein said first haze state-air mixture comprises hazed liquid droplets from about 5 microns to about 10 microns in diameter.

3. In the system of claim 1, wherein said first haze state-air mixture exits said nozzle structure at a pressure from about 20 psi to about 30 psi.

4. In the system of claim 1, wherein said second haze state-air mixture comprises hazed liquid droplets from about 3 microns to about 5 microns in diameter.

5. In the system of claim 1, wherein said third haze state-air mixture comprises hazed liquid droplets of about 3 microns in diameter.

6. In the system of claim 1, wherein said fourth haze state-air mixture is dispersed along a longitudinal distance of about 150 feet to about 200 feet.

7. In the system of claim 1, wherein said fourth haze state-air mixture is dispersed along a distal lateral width of about 25 feet to about 40 feet.

8. In the system of claim 1, wherein said air compressing means, said tank, and said air blowing means are contained within a common housing.

9. In the system of claim 1, wherein said air compressing means is connected to a heating element.

10. In the system of claim 1, wherein said tank is connected to a heating element.

11. In the system of claim 1, wherein said air compressing means turns ON for about 10 seconds to about 15 seconds and then shuts OFF for about 2 minutes to about 3 minutes and then may turn ON again to repeat said cycle.

12. In the system of claim 1, wherein said air blowing means turns ON for about 30 seconds and then shuts OFF for about 2 minutes to about 3 minutes and then may turn ON again to repeat said cycle.

13. In the system of claim 1, wherein said air compressing means turns ON for about 10 seconds to about 15 seconds and then shuts OFF for about 2 minutes to about 3 minutes and then may turn ON again to repeat said cycle; and wherein said air blowing means turns ON for about 30 seconds and then shuts OFF for about 2 minutes to about 3 minutes and then may turn ON again to repeat said cycle.

14. In the system of claim 1, wherein said housing is mounted onto a rotatable turret base for allowing and causing rotation of said housing about a vertical axis.

15. In the system of claim 1, wherein said housing is mounted onto a rotatable turret base for allowing and causing rotation of said housing plus 180 degrees and minus 180 degrees about a vertical axis.

16. In the system of claim 1, wherein said housing is mounted onto a base member; and wherein said base member comprises lifting means for allowing and causing lifting of said housing about a horizontal axis.

17. In the system of claim, 1, wherein a motion sensor is mounted onto said housing, said motion sensor detecting bird motion for activating said system to disperse said fourth haze state-air mixture in the direction of said detected bird motion.

18. An array for generating and dispersing a plurality of fourth haze state-air mixtures comprising a plurality of the systems of claim 1 in a defined physical relationship.

19. In the system of claim 1, wherein a global positioning system is mounted onto said housing for detecting the geographical location of said housing; said system being programmed to be activated for dispersing said fourth haze state-air mixture at a pre-programmed housing location in a pre-programmed direction.

20. A method for generating and dispersing a liquid-droplet haze comprising the steps of:

Containing the liquid that is to be converted into a haze state in a tank and providing such liquid from said tank to a mixing means;

Providing compressed air to said mixing means;

Mixing such liquid and such compressed air in said mixing means;

Providing the output of said mixing means to a nozzle structure for generating a high velocity first haze state-air mixture;

Allowing such high velocity first haze state-air mixture to strike the upper surface of such liquid contained in said tank below said nozzle structure for generating a second haze state-air mixture below said nozzle structure and for generating a third haze state-air mixture laterally from said nozzle structure;

Transporting such third haze state-air mixture from said tank to a haze conduit outlet; and Blowing high speed air past said haze conduit outlet for generating and dispersing a fourth haze state-air mixture.

21. In the method of claim 20, wherein said first haze state-air mixture comprises hazed liquid droplets from about 5 microns to about 10 microns in diameter.

22. In the method of claim 20, wherein said first haze state-air mixture exits said nozzle structure at a pressure from about 20 psi to about 30 psi.

23. In the method of claim 20, wherein said second haze state-air mixture comprises hazed liquid droplets from about 3 microns to about 5 microns in diameter.

24. In the method of claim 20, wherein said third haze state-air mixture comprises hazed liquid droplets of about 3 microns in diameter.

25. In the method of claim 20, wherein said fourth haze state-air mixture is dispersed a longitudinal distance of about 150 feet to about 200 feet.

26. In the method of claim 20, wherein said fourth haze state-air mixture is dispersed along a distal lateral width of about 25 feet to about 40 feet.

27. In the method of claim 20, containing said air compressing means, said tank, and said air blowing means within a common housing.

28. In the method of claim 20, connecting said air compressing means to a heating element.

29. In the method of claim 20, connecting said tank to a heating element.

30. In the method of claim 20, turning ON said air compressing means for about 10 seconds to about 15 seconds and then shutting OFF said air compressing means for about 2 minutes to about 3 minutes and then turning ON again said air compressing means to repeat said cycle.

31. In the method of claim 20, turning ON said air blowing means for about 30 seconds and then shutting OFF said air blowing means for about 2 minutes to about 3 minutes and then turning ON again said air blowing means to repeat said cycle.

32. In the system of claim 20, turning ON said air compressing means for about 10 seconds to about 15 seconds and then shutting OFF said air compressing means for about 2 minutes to about 3 minutes and then turning ON again said air compressing means to repeat said cycle; and turning ON said air blowing means for about 30 seconds and then shutting OFF said air blowing means for about 2 minutes to about 3 minutes and then turning ON again said air blowing means to repeat said cycle.

33. In the method of claim 20, dispersing said fourth haze state-air mixture at various angles about a vertical axis.

34. In the method system of claim 20, dispersing said fourth haze state-air mixture at various angles about a vertical axis up to plus 180 degrees and up to minus 180 degrees.

35. In the method of claim 20, dispersing said fourth haze state-air mixture at various angles about a horizontal axis.

36. In the method of claim 20, detecting the motion of a bird and causing the dispersal of said fourth haze state-air mixture in the direction of said detected bird motion.

37. In the method of claim 20, generating and dispersing a plurality of fourth haze state-air mixtures.

38. In the method of claim 20, utilizing a global positioning system for detecting geographical location and for dispersing said fourth haze state-air mixture at a pre-programmed geographical location and in a pre-programmed direction.

39. In the system of claim 1, wherein said liquid is Methyl Anthranilate.

40. In the method of claim 20, wherein said liquid is Methyl Anthranilate.

* * * * *